(12) United States Patent
Kim et al.

(10) Patent No.: US 11,627,443 B2
(45) Date of Patent: Apr. 11, 2023

(54) APPARATUS AND METHOD FOR COMPENSATING CHANNEL BASED ON ARTIFICIAL NEURAL NETWORK

(71) Applicants: Hyundai Motor Company, Seoul (KR); Kia Motors Corporation, Seoul (KR); Korea National University of Transportation Industry-Academic Cooperation Foundation, Chungju-si (KR)

(72) Inventors: Zeung Il Kim, Gyeonggi-do (KR); Young Cheol Koh, Gyeonggi-do (KR); Jae Hun Jeong, Gyeonggi-do (KR); Chang Ick Song, Chungcheongbuk-do (KR); Seung Ho Han, Jeollabuk-do (KR)

(73) Assignees: Hyundai Motor Company, Seoul (KR); Kia Motors Corporation, Seoul (KR); Korea National University of Transportation Industry-Academic Cooperation Foundation, Chungcheongbuk-do (KR)

( * ) Notice: Subject to any disclaimer, the term of this patent is extended or adjusted under 35 U.S.C. 154(b) by 742 days.

(21) Appl. No.: 16/657,026

(22) Filed: Oct. 18, 2019

(65) Prior Publication Data

US 2020/0396575 A1 Dec. 17, 2020

(30) Foreign Application Priority Data

Jun. 17, 2019 (KR) .................. 10-2019-0071791

(51) Int. Cl.
| | | |
|---|---|---|
| *H04B 7/00* | (2006.01) | |
| *H04W 4/40* | (2018.01) | |
| *G06N 3/04* | (2023.01) | |
| *G06N 3/088* | (2023.01) | |

(52) U.S. Cl.
CPC ................ *H04W 4/40* (2018.02); *G06N 3/04* (2013.01); *G06N 3/088* (2013.01)

(58) Field of Classification Search
CPC ............ H04W 4/40; G06N 3/04; G06N 3/088
See application file for complete search history.

(56) References Cited

U.S. PATENT DOCUMENTS

| | | | | |
|---|---|---|---|---|
| 10,637,544 | B1* | 4/2020 | Shattil ................. | H04B 7/0473 |
| 11,256,965 | B2* | 2/2022 | Kim ...................... | G06N 3/045 |
| 11,334,807 | B1* | 5/2022 | O'Shea ................. | G06N 20/00 |
| 2016/0096270 | A1* | 4/2016 | Ibarz Gabardos ....... | B25J 9/163 |
| | | | | 901/3 |
| 2019/0053178 | A1* | 2/2019 | Merwaday ............ | H04W 4/023 |
| 2020/0396575 | A1* | 12/2020 | Kim ...................... | G06N 3/045 |
| 2022/0138523 | A1* | 5/2022 | Li .......................... | G06N 3/008 |
| | | | | 706/22 |
| 2022/0156581 | A1* | 5/2022 | Li .......................... | G06N 3/045 |

\* cited by examiner

*Primary Examiner* — April G Gonzales
(74) *Attorney, Agent, or Firm* — Fox Rothschild LLP (57) ABSTRACT

An apparatus for compensating a channel based on an artificial neural network includes a channel learning device that learns a property of the channel, and a channel compensating device that compensates for an error of the channel based on a learning result of the channel learning device.

17 Claims, 7 Drawing Sheets

APPARATUS AND METHOD FOR COMPENSATING CHANNEL BASED ON ARTIFICIAL NEURAL NETWORK

CROSS-REFERENCE TO RELATED APPLICATION

This application claims under 35 U.S.C. § 119(a) the benefit of Korean Patent Application No. 10-2019-0071791, filed in the Korean Intellectual Property Office on Jun. 17, 2019, the entire contents of which are incorporated herein by reference.

BACKGROUND

(a) Technical Field

The present disclosure relates to a technique for compensating for an error (noise, distortion) of a channel based on an artificial neural network.

(b) Description of the Related Art

Vehicle-to-everything (V2X) communication technology, which is a core technology for providing traffic safety and application services to a driver, requires high-reliability and low latency (HR/LL) because data loss and transmission delay are directly related to the driver's safety.

However, wireless access in vehicular environment (WAVE) technology, which is based on the IEEE 802.11p physical layer standard, is a communication technology that improves the IEEE 802.11a/g wireless LAN technology to be suitable for a vehicle environment. Because the WAVE technology specifies the number of subcarners and pilots to be suitable for the speed at which pedestrians move, it is difficult to accurately estimate a channel due to channel change (high Doppler effect and multipath) caused by high speed movement of a vehicle.

Although there has been proposed a data pilot aided (DPA) scheme of estimating a channel of a current orthogonal frequency division multiplexing (OFDM) symbol by constructing a virtual data pilot signal based on a previous OFDM symbol as a scheme of estimating a rapidly changing channel in a WAVE V2X communication environment, the DPA channel estimation scheme causes an error in the de-mapping process due to distortion and noise of the estimated channel.

SUMMARY

An aspect of the present disclosure provides an apparatus for compensating a channel based on an artificial neural network, which is capable of reducing a packet error rate due to a high-speed movement of a vehicle by learning a property of a vehicle-to-everything communication channel and compensating for distortion and noise of the channel estimated in a data pilot aided (DPA) scheme based on it, and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for compensating a channel based on an artificial neural network includes a channel learning device that learns a property of the channel, and a channel compensating device that compensates for an error of the channel based on a learning result of the channel learning device.

The channel learning device may learn a property of a vehicle-to-everything (V2X) communication channel.

The channel learning device may learn channel correlation in a frequency domain.

The channel learning device may be implemented with an auto-encoder. The auto-encoder may be implemented with one input layer, three hidden layers, and one output layer. The hidden layer may include a first hidden layer including 40 hidden units, a second hidden layer including 20 hidden units, and a third hidden layer including 40 hidden units.

The channel may include a channel estimated by a data pilot-aided (DPA) scheme.

The channel compensating device may convert the channel estimated by the DPA scheme into a vector of a complex form, and compensate for the error of the channel by applying a pre-optimized learning parameter to the vector.

The channel compensating device may sequentially compensate for the error of the channel for a plurality of orthogonal frequency division multiplexing (OFDM) symbols.

According to an aspect of the present disclosure, a method of compensating a channel based on an artificial neural network includes learning, by a channel learning device, a property of the channel, and compensating, by a channel compensating device, for an error of the channel based on a learning result of the channel learning device.

The learning of the property of the channel may include learning a property of a vehicle-to-everything (V2X) communication channel.

The learning of the property of the channel may include learning channel correlation in a frequency domain.

The channel learning device may be implemented with an auto-encoder. The auto-encoder may be implemented with one input layer, three hidden layers, and one output layer. The hidden layer may include a first hidden layer including 40 hidden units, a second hidden layer including 20 hidden units, and a third hidden layer including 40 hidden units.

The channel may include a channel estimated by a data pilot-aided (DPA) scheme.

The compensating of the error of the channel may include converting the channel estimated by the DPA scheme into a vector of a complex form, and compensating for the error of the channel by applying a pre-optimized learning parameter to the vector.

The compensating of the error of the channel may include sequentially compensating for the error of the channel for a plurality of orthogonal frequency division multiplexing (OFDM) symbols.

According to an aspect of the present disclosure, a non-transitory computer readable medium containing program instructions executed by a processor includes: program instructions that learn a property of a channel based on an artificial neural network; and program instructions that compensate for an error of the channel based on a learning result of the channel learning device.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
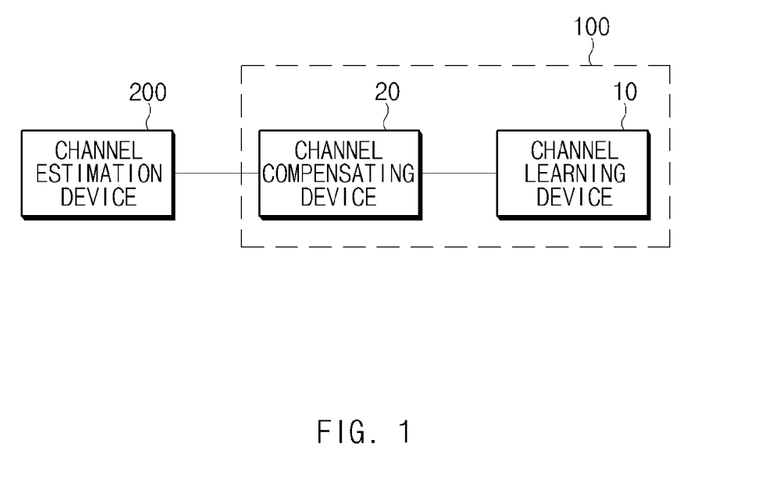
FIG. 1 is a view illustrating an apparatus for compensating a channel based on an artificial neural network according to an embodiment of the present disclosure.

FIG. 1 is a view illustrating an apparatus for compensating a channel based on an artificial neural network according to an embodiment of the present disclosure.

As shown in FIG. 1, an apparatus 100 for compensating a channel based on an artificial neural network according to an embodiment of the present disclosure may include a channel learning device 10 and a channel compensating device 20. According to a scheme of implementing the apparatus 100 for compensating the channel based on the artificial neural network according to an embodiment of the present disclosure, components may be combined with each other and implemented as a control device (not shown), and some components may be omitted.

In this case, the control device may perform overall control so that each of the components performs the normal function. In addition, the control device may be implemented in the form of hardware or software, and of course, may be implemented in the form of a combination of hardware and software. Preferably, the control device may be implemented as a microprocessor, but the embodiment is not limited thereto.

The control device may include storage (not shown). The storage may include at least one type of a storage medium of memories of a flash memory type, a hard disk type, a micro type, a card type (e.g., a secure digital (SD) card or an extreme digital (XD) card), and the like, and a random access memory (RAM), a static RAM, a read-only memory (ROM), a programmable ROM (PROM), an electrically erasable PROM (EEPROM), a magnetic memory (MRAM), a magnetic disk, and an optical disk type memory.

The channel learning device 10 may be implemented, for example, as an auto encoder that receives vehicle-to-everything (V2X) communication channels as learning data and learns a property of each channel. That is, the channel learning device 10 learns correlations between channels in the frequency domain.

In this case, V2X communication (i.e., vehicle communication) refers to vehicle-to-vehicle (V2V) wireless communication between vehicles, vehicle-to-infrastructure (V21) wireless communication between the vehicle and the infra, in-vehicle wired and wireless networking (IVN), vehicle-to-pedestrian (V2P) communication, and the like.

Hereinafter, the configuration of the auto encoder will be described with reference to FIG. 2.

Figure 2:
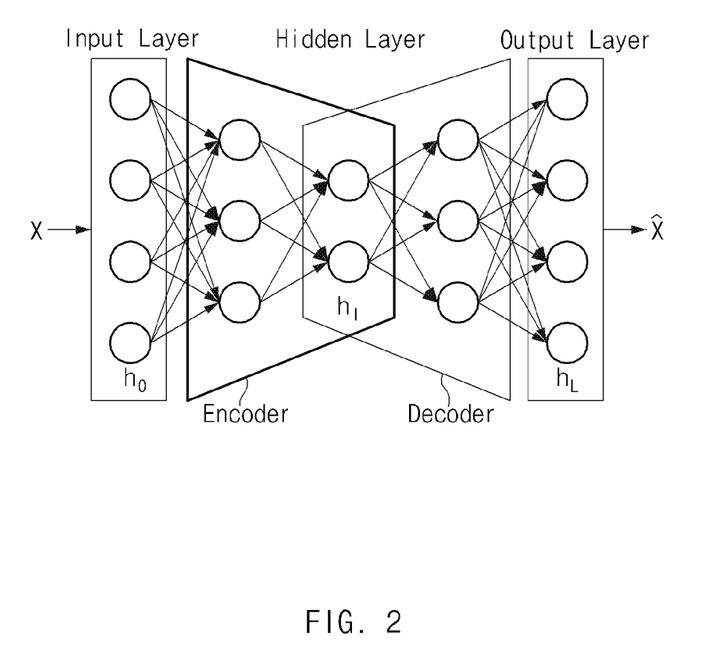
FIG. 2 is a view illustrating a structure of an auto encoder provided in an apparatus for compensating a channel based on an artificial neural network according to an embodiment of the present disclosure.

FIG. 2 is a view illustrating a structure of an auto encoder provided in an apparatus for compensating a channel based on an artificial neural network according to an embodiment of the present disclosure.

In general, deep learning (or deep neural network) which is a kind of machine learning, includes several layers of artificial neural network (ANN) between an input and an output.

In case of a multi-layer artificial neural network, learning may not be done properly. To solve this, an auto-encoder has been proposed as a machine learning scheme.

The auto encoder, which is a learning scheme designed to copy inputs to outputs as shown in FIG. 2, searches for the optimal solution by finding correlations between a property in similar data.

When the artificial neural network is configured, the number of hidden units HI in each layer of a hidden layer is configured to be less than the dimensions ho of an input layer so that the features of input data may be extracted and noise may be removed.

In order to utilize the features of such an auto-encoder, according to an embodiment of the present disclosure, the auto encoder is first learned by utilizing channel data of a frequency domain generated based on a V2X channel model in an off-line as learning data. In this case, because channels in the frequency domain are generated from a small number of channel taps in the time domain, the channels have a high correlation with each other.

Therefore, the auto encoder may learn channel features including correlations between channels in the frequency domain through unsupervised learning with a small number of hidden layers and hidden units.

The auto-encoder thus learned may be used to remove an error (distortion and noise) of the channel estimated by a DPA scheme.

In particular, when considering an auto-encoder having 'L' layers, the l-th hidden layer $h_l$, $h_l \in R^{d_l/l}$ having a di dimensions may be expressed by the following Equation 1.

$$h_l = \phi_l(W_l h_{l-1} + b_l) \quad \text{[Equation 1]}$$
$$= \begin{cases} \max(W_l h_{l-1} + b_l, 0) & \text{for } l \neq L \\ W_l h_{l-1} + b_l & \text{for } l = L \end{cases}$$

In particular, $W_l(W_l \in R^{d_l \times d_{l-1}})$ denotes a weight matrix, $b_l(b_l \in R^{d_l \times 1}$ denotes a bias vector, and $\phi_l$ denotes an activation function.

As an example, the auto encoder may be implemented with one input layer, three hidden layers, and one output layer. In this case, the number of hidden units of each hidden layer may be set to 40 hidden units of the first hidden layer, 20 hidden units of the second hidden layer, and 40 hidden units of the third hidden layer.

Hereinafter, the leaning process of the auto encoder will be described.

First, a CIR (Channel Impulse Response) of a random time domain is generated based on the profile of the V2X channel, and the generated CIR is converted into a channel frequency response (CFR) in a frequency domain through fast fourier transform (FFT). The converted result is expressed as H.

After that, using the H of the transformed frequency domain to convert to an input vector (Input vector). In this case, the input vector x (n) may be expressed as Equation 2 below as an example.

$$x^{(n)} = [\Re\{H^{(n)}\}, \Im\{H^{(n)}\}]^T \quad \text{[Equation 2]}$$

In particular, $[\ ]^T$ represents a transpose operation, R{ } represents a real number part of a complex number, and J{ } represents an imaginary part of a complex number.

In addition, H (n) refers to the n-th learning data corresponding to the data subcarrier (SD) and the pilot subcarrier (SP). In this case, a guard band and a center subcarrier may be excluded from the data subcarrier.

For example, the learning data refers to 52 subcarriers (4 pilot subcarriers and 48 data subcarriers) excluding 11 guard bands and 1 DC subcarrier, among a total of 64 OFDM subcarriers.

H (n) may be expressed as, for example, following Equation 3.

$$H^{(n)} = [H^{(n)}(k)]_{k \in S_D \cup S_P} \quad \text{[Equation 3]}$$

On the other hand, the output vector $\hat{x}^{(n)}$ of the auto encoder may be expressed by the following Equation 4.

$$\hat{x}^{(n)} = W_L h_{L-1} + b_L \quad \text{[Equation 4]}$$

The auto encoder optimizes the learning parameter $\theta(\Theta \in \{W_l, b_l\}_{l=1}^L)$ to minimize the mean squared error as shown in the following Equation 5 based on the N pieces of learning data.

$$\min_{\Theta} \|x - \hat{x}\|^2 = \min_{\Theta} \frac{1}{N} \sum_{n=1}^{N} \|x^{(n)} - \hat{x}^{(n)}\|^2 \quad \text{[Equation 5]}$$

For reference, in the learning process, the learning rate may be set to 0.0001, the Adam optimizer may be used to calculate the MSE, and parameters may be initialized through the Xavier technique.

Thereafter, the learned auto encoder may be utilized in the channel estimation process of the IEEE 802.11p system.

Next, the channel compensating device 20 compensates for the noise and distortion of the channel estimated by a channel estimation device 200 based on the results learned by the channel learning device 10. In this case, the channel estimation device 200 may estimate the channel in the DPA scheme.

Hereinafter, the function of the channel compensating device 20 will be described with reference to FIG. 3.

Figure 3:
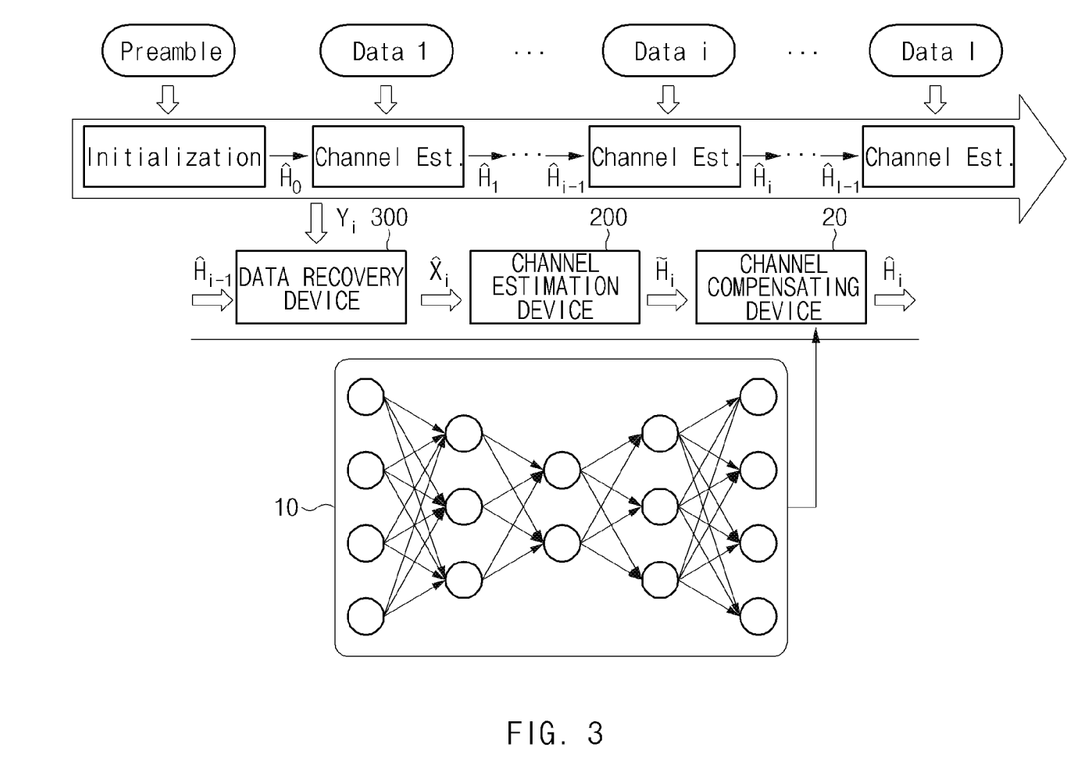
FIG. 3 is a view illustrating a function of a channel compensating device provided in an apparatus for compensating a channel based on an artificial neural network according to an embodiment of the present disclosure.

FIG. 3 is a view illustrating a function of a channel compensating device provided in an apparatus for compensating a channel based on an artificial neural network according to an embodiment of the present disclosure, where an error compensating process is performed from an preamble to a last OFDM symbol (DATA I).

As shown in FIG. 3, DATA 1 to DATA L represent OFDM symbols, and an initial channel estimation value estimated through an initial channel estimation process may be used to estimate a channel for DATA 1.

In an example, the initial channel may be estimated by using two long learning symbols of the preamble. In this case, the initial channel estimation value $\hat{H}_0(k)$ may be expressed by the following Equation 6.

$$\hat{H}_0(k) = \frac{Y_{O_1}(k) + Y_{O_2}(k)}{2X_0(k)}, \text{ for } k \in \mathbb{S}_D \qquad \text{[Equation 6]}$$

In particular, $Y_{O_1}(k)$ and $Y_{O_2}(k)$ represent two long learning symbols, and $X_0(k)$ represents a long learning symbol known at a receiving end.

Then, a data recovery device 300 restores data $\hat{X}_i(k)$ for a data subcarrier of the i-th OFDM symbol by using the i-th received signal $Y_i(k)$ and the channel $H_{i-1}(k)$ of the i−1 th symbol. This may be expressed by the following Equation 7.

$$\hat{X}_i(k) = Q\left(\frac{Y_i(k)}{\hat{H}_{i-1}(k)}\right), \text{ for } k \in \mathbb{S}_D \qquad \text{[Equation 7]}$$

Thereafter, the channel estimation device 200 estimates a channel for a current OFDM symbol by using the $X_i(k)$ corresponding to data $\hat{X}_i(k)$ and four pilot subcarriers Sp restored by the data recovery device 300. In this case, the estimated channel $\tilde{H}_i(k)$ may be expressed by the following Equation 8.

$$\tilde{H}_i(k) = \begin{cases} \frac{Y_i(k)}{\hat{X}_i(k)}, & \text{for } k \in \mathbb{S}_D \\ \frac{Y_i(k)}{X_i(k)}, & \text{for } k \in \mathbb{S}_P \end{cases} \qquad \text{[Equation 8]}$$

Thereafter, the channel compensating device 20 converts the channel $\tilde{H}_i(k)$ estimated by the channel estimation device 200 into a vector of a complex number form. The converted vector may be expressed by the following Equation 9 as an example.

$$x = [\Re\{\tilde{H}_i(k)\}, \Im\{\tilde{H}_i(k)\}]^T \text{ for } k \in \mathbb{S}_D \cup \mathbb{S}_P \qquad \text{[Equation 9]}$$

Then, the channel compensating device 20 compensates the noise and distortion of the channel $\tilde{H}_i(k)$ estimated by the channel estimation device 200 by applying a learning parameter optimized to the vector of the complex number type based on the result learned by the channel learning device 10. The compensated result may be expressed by the following Equation 10.

$$\hat{x} = [\Re\{\hat{H}_i(k)\}, \Im\{\hat{H}_i(k)\}]^T \text{ for } k \in \mathbb{S}_D \cup \mathbb{S}_P \qquad \text{[Equation 9]}$$

Thereafter, the channel compensating device 20 may be used to estimate the channel of the next OFDM symbol after integrating $\hat{H}_i(k)$ into a complex form.

Because the process of estimating the initial channel and the channel estimating process by the channel estimation device 200 in the above-described channel compensation process, which are generally well-known techniques, are not the gist of the present disclosure, they will be briefly described.

Figure 4:
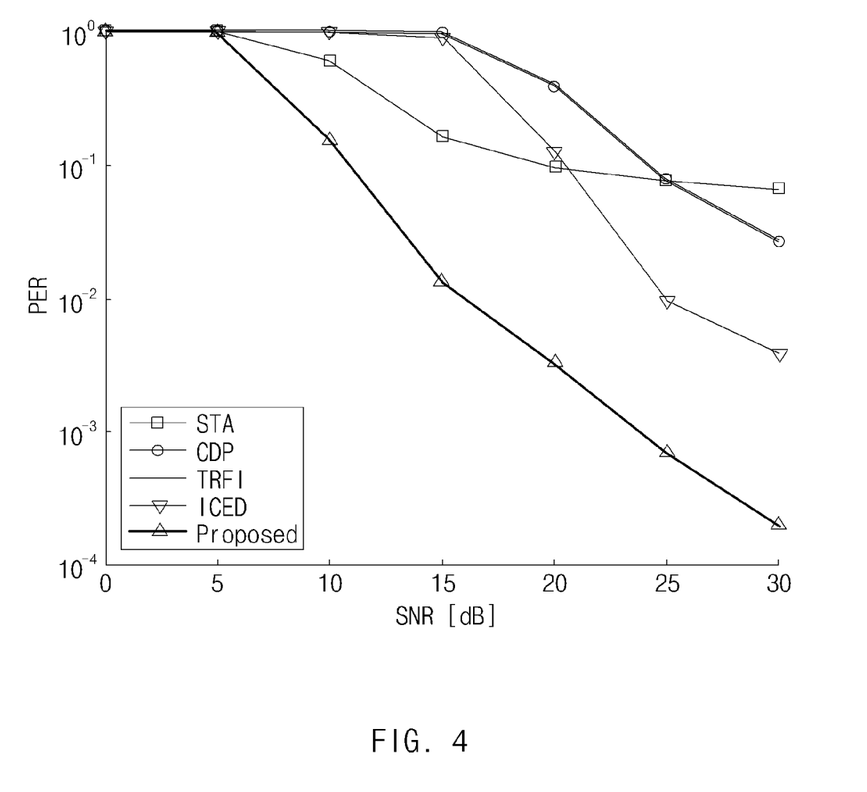
FIG. 4 is a performance analysis diagram of an apparatus for compensating a channel based on an artificial neural network according to an embodiment of the present disclosure.

FIG. 4 is a performance analysis diagram of an apparatus for compensating a channel based on an artificial neural network according to an embodiment of the present disclosure. FIG. 4 illustrates a packet error rate in the environment in which the relative speed between vehicles is 126 km/h.

As illustrated in FIG. 4, each graph represents a packet error rate when an embodiment of the present disclosure is not applied and a packet error rate when an embodiment of the present disclosure is applied.

As may be understood through FIG. 4, the packet error rate, when an embodiment of the present disclosure (proposed) is applied, is much smaller than that of a case where an embodiment of the present disclosure is not applied, that is, spectral temporal averaging, constructed data pilot (CDP), time domain reliable test frequency domain interpolation (TRFI), and iterative channel estimation and decoding (ICED), as a type of DPA scheme, are applied respectively.

Figure 5:
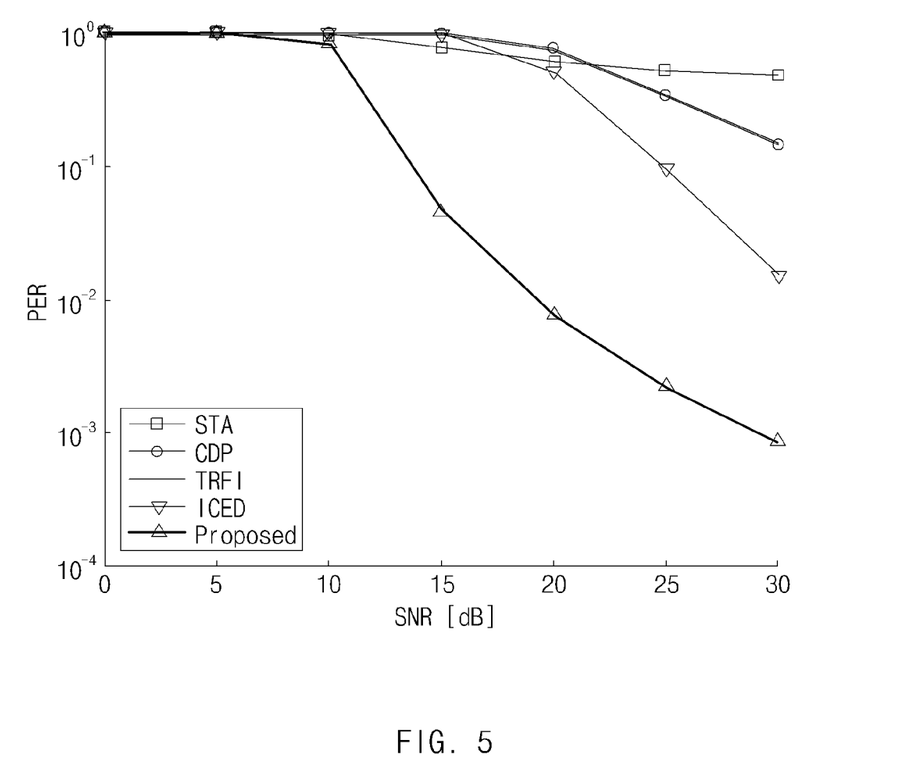
FIG. 5 is another performance analysis diagram of an apparatus for compensating a channel based on an artificial neural network according to an embodiment of the present disclosure.

FIG. 5 is another performance analysis diagram of an apparatus for compensating a channel based on an artificial neural network according to an embodiment of the present disclosure, where a packet error rate in an environment where a relative speed between vehicles is 252 km/h is illustrated.

As shown in FIG. 5, each graph represents a packet error rate when an embodiment of the present disclosure is not applied and a packet error rate when an embodiment of the present invention is applied.

As may be understood through FIG. 5, the packet error rate, when an embodiment of the present disclosure (proposed) is applied, is much smaller than that of a case where an embodiment of the present disclosure is not applied, that is, spectral temporal averaging, constructed data pilot (CDP), time domain reliable test frequency domain interpolation (TRFI), and iterative channel estimation and decoding (ICED), as a type of DPA scheme, are applied respectively.

Meanwhile, an embodiment of the present disclosure may be implemented in an 802.11p chipset structure. In this case, an embodiment may be implemented to perform the channel compensating process in the case of low speed driving but not in the case of high speed driving, based on the speed of the vehicle.

Figure 6:
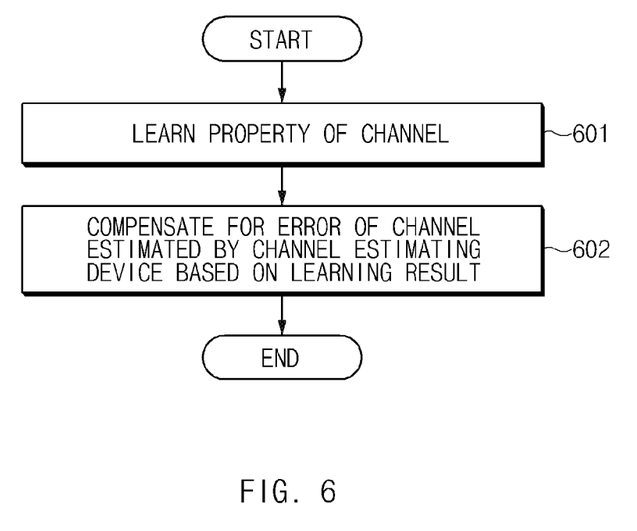
FIG. 6 is a flowchart illustrating a method of compensating a channel based on an artificial neural network according to an embodiment of the present disclosure.

FIG. 6 is a flowchart illustrating a method of compensating a channel based on an artificial neural network according to an embodiment of the present disclosure.

First, in operation 601, the channel learning device 10 learns a property of a channel.

Thereafter, in operation 602, the channel compensating device 20 compensates for the error of the channel estimated by the channel estimation device 200 based on the learning result of the channel learning device 10.

Figure 7:
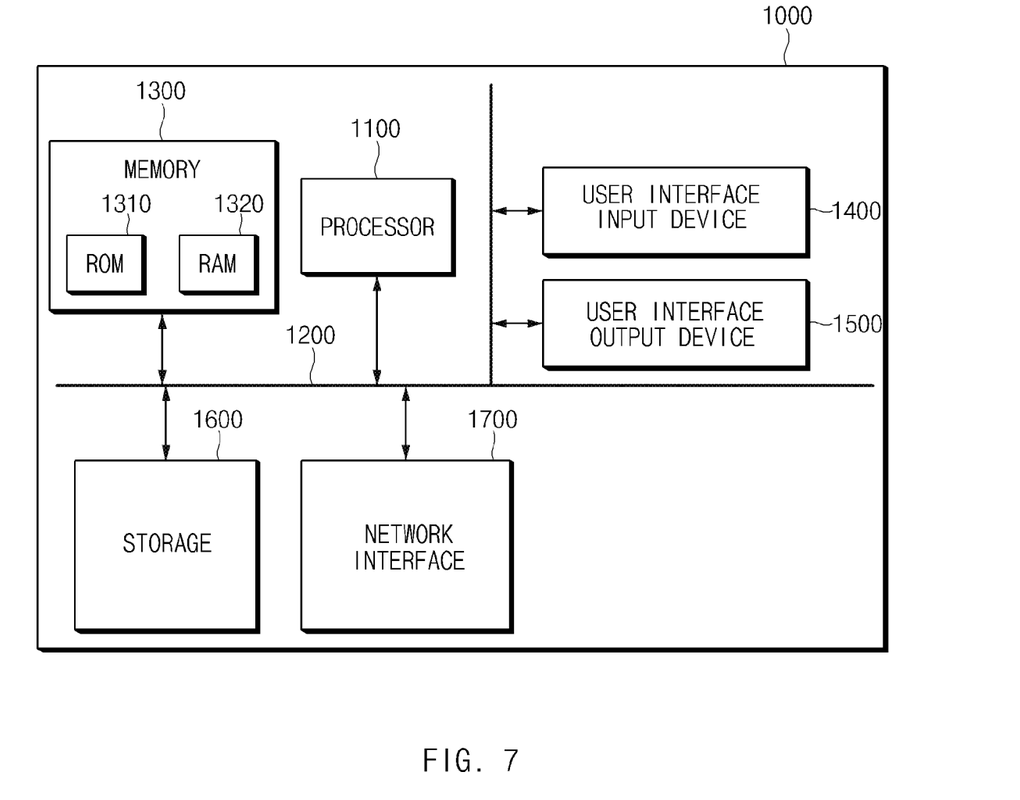
FIG. 7 is a view illustrating a computing system that executes a method of compensating a channel based on an artificial neural network according to an embodiment of the present disclosure.

FIG. 7 is a view illustrating a computing system that executes a method of compensating a channel based on an artificial neural network according to an embodiment of the present disclosure.

Referring to FIG. 7, a method of compensating a channel based on an artificial neural network according to an embodiment of the present disclosure may be implemented through a computing system. A computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The apparatus and method for compensating a channel based on an artificial neural network according to an embodiment of the present disclosure may learn the property of a V2X communication channel and compensate for the distortion and noise of the channel estimated by the DPA scheme based on the channel property, so that it is possible to reduce the packet error rate due to the high-speed movement of the vehicle.

In addition, the apparatus and method for compensating a channel based on an artificial neural network according to an embodiment of the present disclosure may combine the DPA channel estimation scheme and the auto encoder, which is one of the unsupervised learning schemes of the neural network, to compensate for the weaknesses of the DPA scheme with a relatively low complexity and to dramatically improve the accuracy of the channel estimation.

In addition, the apparatus and method for compensating a channel based on an artificial neural network according to an embodiment of the present disclosure may learn the interference and distortion of the wireless channel which was difficult to analyze mathematically through the learning scheme of an auto encoder.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for compensating a channel based on an artificial neural network, the apparatus comprising:
    a channel learning device configured to learn a property of the channel; and
    a channel compensating device configured to compensate for an error of the channel based on a learning result of the channel learning device,
    wherein the channel includes a channel estimated by a data pilot-aided (DPA) scheme.

2. The apparatus of claim 1, wherein the channel learning device is configured to learn a property of a vehicle-to-everything (V2X) communication channel.

3. The apparatus of claim 1, wherein the channel learning device is configured to learn channel correlation in a frequency domain.

4. The apparatus of claim 1, wherein the channel learning device is implemented with an auto-encoder.

5. The apparatus of claim 4, wherein the auto-encoder is implemented with one input layer, three hidden layers, and one output layer.

6. The apparatus of claim 5, wherein the hidden layer includes a first hidden layer including 40 hidden units, a second hidden layer including 20 hidden units, and a third hidden layer including 40 hidden units.

7. The apparatus of claim 1, wherein the channel compensating device is configured to convert the channel estimated by the DPA scheme into a vector of a complex form, and compensate for the error of the channel by applying a pre-optimized learning parameter to the vector.

8. The apparatus of claim 7, wherein the channel compensating device is configured to sequentially compensate for the error of the channel for a plurality of orthogonal frequency division multiplexing (OFDM) symbols.

9. A method of compensating a channel based on an artificial neural network, the method comprising:
    learning, by a channel learning device, a property of the channel; and
    compensating, by a channel compensating device, for an error of the channel based on a learning result of the channel learning device;
    wherein the channel includes a channel estimated by a data pilot-aided (DPA) scheme.

10. The method of claim 9, wherein learning the property of the channel includes learning a property of a vehicle-to-everything (V2X) communication channel.

11. The method of claim 9, wherein learning the property of the channel includes learning channel correlation in a frequency domain.

12. The method of claim 9, wherein the channel learning device is implemented with an auto-encoder.

13. The method of claim 12, wherein the auto-encoder is implemented with one input layer, three hidden layers, and one output layer.

14. The method of claim 13, wherein the hidden layer includes a first hidden layer including 40 hidden units, a second hidden layer including 20 hidden units, and a third hidden layer including 40 hidden units.

15. The method of claim 9, wherein compensating the error of the channel includes:
    converting the channel estimated by the DPA scheme into a vector of a complex form; and
    compensating for the error of the channel by applying a pre-optimized learning parameter to the vector.

16. The method of claim 15, wherein compensating the error of the channel includes sequentially compensating for the error of the channel for a plurality of orthogonal frequency division multiplexing (OFDM) symbols.

17. A non-transitory computer readable medium containing program instructions executed by a processor, the computer readable medium comprising:
    program instructions that learn a property of a channel based on an artificial neural network; and
    program instructions that compensate for an error of the channel based on a learning result of the channel learning device;

wherein the channel includes a channel estimated by a data pilot-aided (DPA) scheme.

* * * * *